(No Model.)
J. R. SUTER.
CULTIVATOR.
No. 351,720. Patented Oct. 26, 1886.
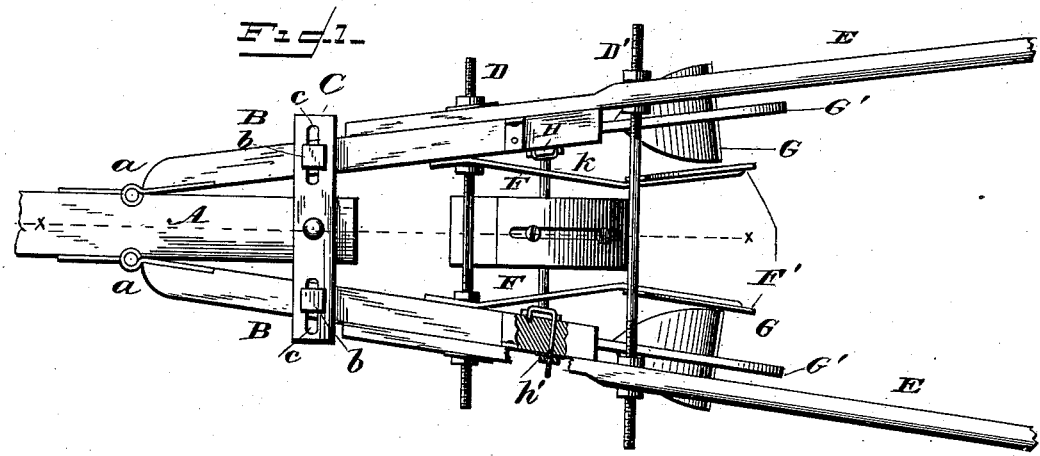
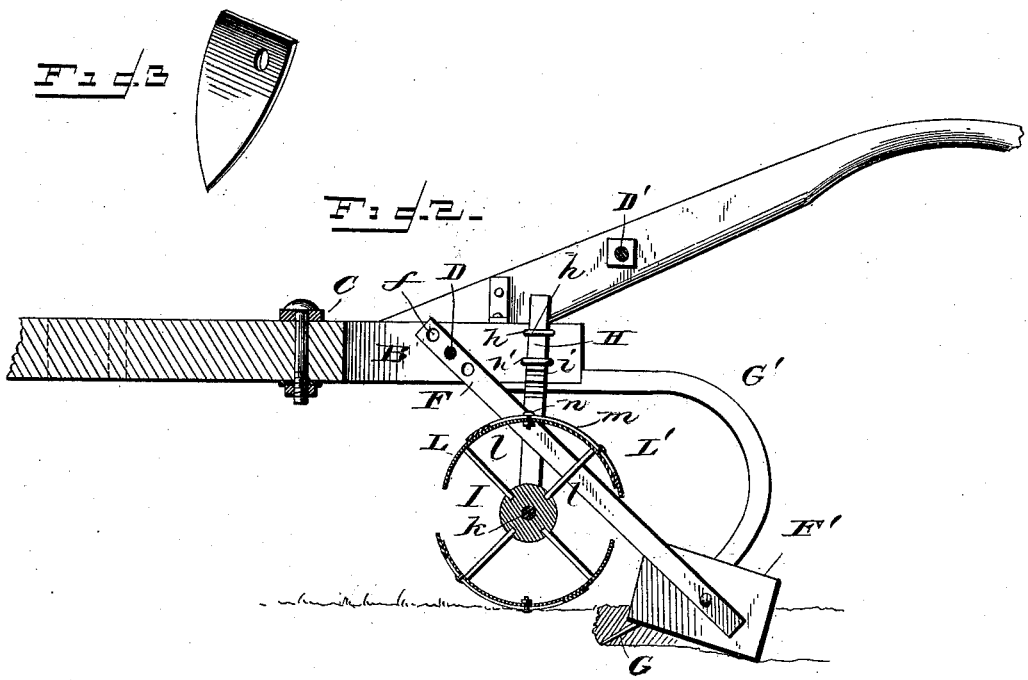
WITNESSES
G. S. Elliott
E. M. Johnson
John R. Suter.
INVENTOR
Attorney

UNITED STATES PATENT OFFICE.

JOHN R. SUTER, OF CONWAY, ARKANSAS.

CULTIVATOR.

SPECIFICATION forming part of Letters Patent No. 351,720, dated October 26, 1886.

Application filed June 24, 1886. Serial No. 206,134. (No model.)

*To all whom it may concern:*

Be it known that I, JOHN R. SUTER, a citizen of the United States of America, residing at Conway, in the county of Faulkner and State of Arkansas, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in cultivators or double-shovel plows which are designed especially for cultivating ground in which cotton or corn has been planted, and the object of my invention being to provide a device which will cultivate on each side of the row, said device having a central rotary wheel which presses upon the surface of the ground so as to leave hills between the spaces in the wheel; and to this end my invention consists in a cultivator, the construction of which will be hereinafter fully set forth, and specifically pointed out in the claims.

In the accompanying drawings, which illustrate my invention, Figure 1 is a plan view of a cultivator constructed in accordance with my invention. Fig. 2 is a sectional view taken through the line $x\ x$ of Fig. 1; and Fig. 3 is a detail perspective view of one of the cultivator-shovels detached.

A refers to the main beam of the cultivator, which has rigidly attached thereto, by means of hinges $a\ a$, plow-beams B B, which diverge from each other from their point of attachment to the main beam A. Near the rear end of the main beam A a transverse bar, C, is rigidly attached thereto, said bar being provided with slots $c\ c$, through which pass bolts $b$, which are attached to the plow-beam. By loosening these bolts $b$ and properly manipulating the nuts attached to the threaded bars D and D', the plow-beams may be adjusted laterally to suit the width of the rows. The bar D passes through each of the plow-beams, and also through the lower ends of the handles E, and assists in securing these parts to each other. This bar also passes through perforations in the ends of the bars F, so as to attach the same to the plow-beams, the lower ends of said bars having rigidly attached thereto fenders F', which lie adjacent to the cultivating-shovels G. The bars F F are provided at their upper ends with a series of perforations, $f$, so that the fenders can be properly adjusted either to the front or rear of the shovels G.

G' refers to the shovel-beams, which are rigidly attached to the under side of the beams B.

The cultivator hereinbefore described can be readily adjusted laterally, and the parts hereinbefore mentioned may be employed as an ordinary cultivator which will cultivate between rows, the fenders preventing the earth being thrown upon the plants. If desirable, shovels constructed as shown in Fig. 3 may be attached to the ends of the beams G', said cultivator-blades having an opening for the securing-bolt near one corner of the same, so that the greater portion of the cultivating-shovel will lie to one side of the beam to which it is attached.

H refers to depending bars, which are attached to the inner sides of the beams B, near their rear ends, by means of staples $h$ and bent bolts $h'$, said bent bolts being adapted to engage with horizontal recesses $i$ in said bars, so that the same can be adjusted vertically so as to regulate the distance of the rotary cultivator or wheel I, which is journaled in the lower ends of the bars H. The hub of the wheel I is provided with a transverse shaft, $k$, which is of sufficient length to extend for a considerable distance through the eyes in the lower end of the bars H, so as to permit the supporting-frame to be adjusted laterally. The hub of the wheel I has rigidly attached thereto spokes $l\ l$, which carry at their outer ends curved or segmental plates L, about which are attached correspondingly-curved plates L', which are centrally slotted, as shown at $m$. Through these slots bolts $n$ extend, for attaching the outer plates, L', to the inner plates, L.

The plates L and L', hereinbefore referred to, are not curved on a true circle; but one end of each plate is a greater distance from the center than the opposite ends of the same plate.

By this construction, when the plates L' are adjusted upon plates L, the size of the opening or space between the same may be varied, and the wheel I runs upon the rows, the spaces or openings therein leaving hills or the ground undisturbed.

In cultivating the ground after the grain or seeds have sprouted, wheels of a proper size may be attached to a cultivator, the openings between the plates corresponding with the distance between the rows, so that the plants may project through the openings in the peripheries of the wheel, so as not to be crushed down when the wheel passes above them. The wheel I, when employed in connection with the cultivator, will also serve to regulate the depth of the shovels.

I am aware that it is not broadly new to provide a cultivator or double-shovel plow with means whereby said shovels can be adjusted laterally, and that it is common to apply fenders to such cultivators.

I claim—

1. The combination, with a double-shovel cultivator or plow, of a rotary wheel provided with segmental plates L, which are rigidly attached to the hub thereof, correspondingly-curved plates L', with slots and attaching means for securing them adjustably above the plates L, said wheel adapted to operate in front of the cultivating-shovels, and devices for vertically adjusting said rotary wheel to raise or lower said shovels, substantially as shown, and for the purpose set forth.

2. The combination, in a double-shovel cultivator provided with fenders, as shown, of a vertically-adjustable cultivator-wheel, consisting of a hub provided with spokes, to which rigid segmental plates are attached, adjustable plates secured above the same, and supporting means or bars H, being provided at their lower ends with eyes for the reception of a transverse shaft which passes through the hub and beyond said eyes, substantially as shown, and for the purpose set forth.

In testimony whereof I affix my signature in presence of two witnesses.

JOHN R. SUTER.

Witnesses:
JOHN W. DUNCAN,
W. H. DUNCAN.